United States Patent

[11] 3,625,529

[72] Inventor James H. Donachy
    Wheaton, Md.
[21] Appl. No. 16,894
[22] Filed Mar. 5, 1970
[45] Patented Dec. 7, 1971
[73] Assignee The United States of America as
    represented by the Secretary of the
    Department of Health, Education and
    Welfare

[54] FREE RUNNING DRAW CHUCK
    7 Claims, 3 Drawing Figs.
[52] U.S. Cl. .................................................. 279/1 R,
                                                      82/38
[51] Int. Cl. ................................................. B23b 5/00

[50] Field of Search ............................................ 279/1 R, 1
                                            A; 82/1.4, 31, 34, 38; 214/1.1

[56] References Cited
    FOREIGN PATENTS
    118,676  9/1958  U.S.S.R. ...................... 82/1.4

Primary Examiner—Andrew R. Juhasz
Assistant Examiner—James F. Coan
Attorney—Holman & Stern ABSTRACT: Free running draw chuck device for use in a lathe permitting rotation of an elongated, relatively fine workpiece or mandrel at high speeds under tension without deviation or "whipping." Use of the device in formation of fine, wire reinforced catheters is shown.

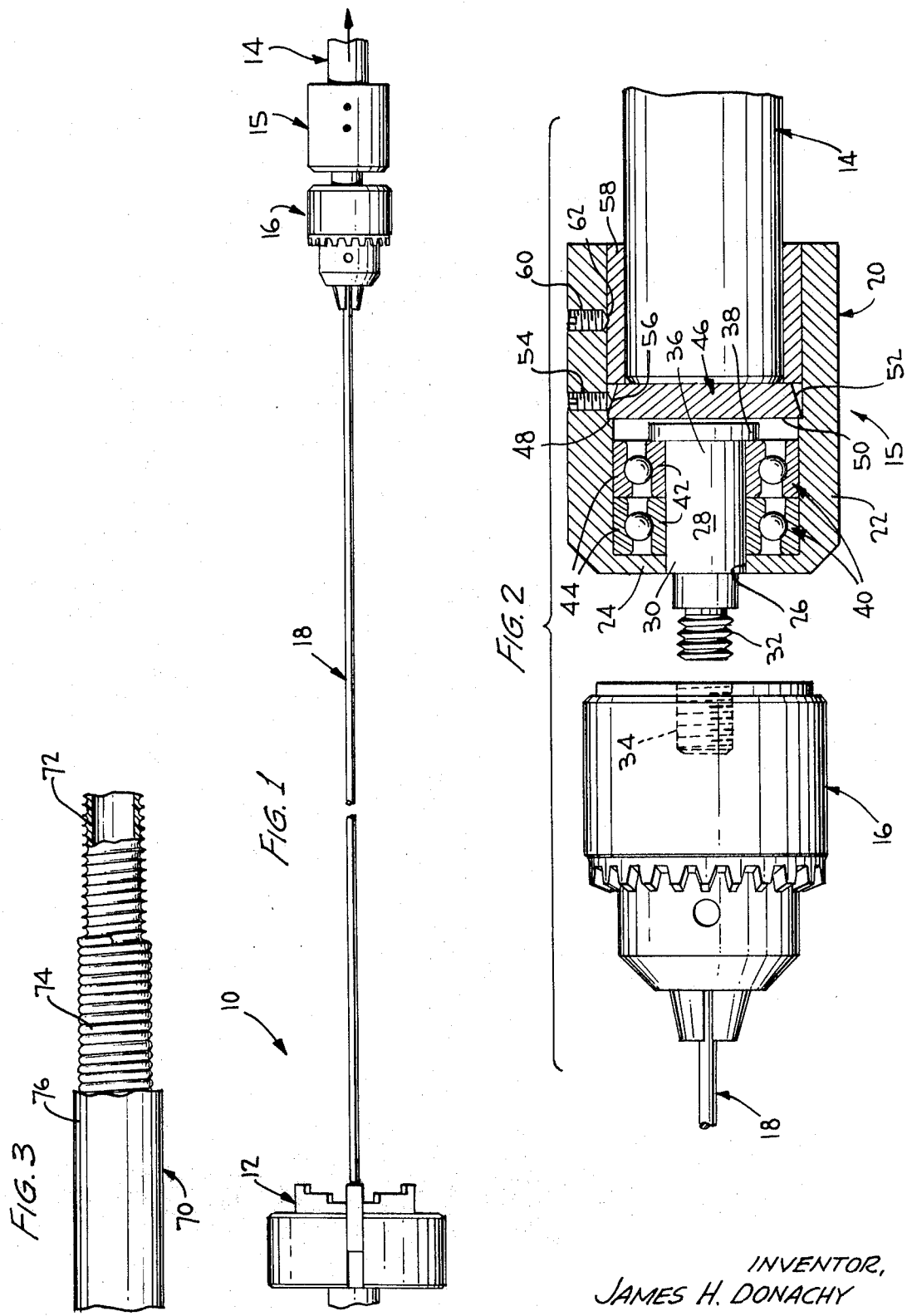

FREE RUNNING DRAW CHUCK

This invention relates to a free running draw chuck for use with a lathe and relates more particularly to a chuck which is capable of firmly clamping a relatively thin, elongated, flexible workpiece, permitting rotation of the same under high speed, while the workpiece is maintained under tension to minimize "whipping"

The device of the instant invention is designed for use with a turning lathe machine tool which includes a rotatable head stock and a tailstock having a nonrotatable or fixed tailstock spindle. Such lathes are commonly used for carrying a workpiece between the headstock and the tailstock and for rotating the workpiece during a machining process. However, it is quite difficult to provide for rotation of a workpiece which is relatively thin and elongated, providing the same with great flexibility, since such a workpiece, in order to preclude oscillation or "whipping" due to its flexibility, when rotated at high speeds, must be maintained under substantial tension. The maintenance of tension on the workpiece causes difficulty in providing rotation. The device of the instant inventive concept is a free running draw chuck which permits rotation of the workpiece, even at relatively high speeds, while the workpiece is maintained under high tension between its ends.

The need for a device of the type with which the instant invention is concerned is particularly critical in the production of dimensionally accurate catheters for biomedical use, where such catheters must have an extremely fine internal diameter.

Thus, the device of this invention is particularly adapted for use in the formation of catheters of this type, although it is to be understood that this device will have other applications which are obvious to those skilled in the art. However, for convenience, the device of this invention will be described hereinafter as the same would be used for the fabrication of fine diameter catheters.

It is a primary object of this invention to provide a free running draw chuck which is particularly valuable where other constraints prohibit the use of ordinary live-centers and follow-rests.

A further object of this invention is the provision of a free running draw chuck which permits high-speed rotation of a relatively thin, elongated, flexible workpiece in a lathe, while the workpiece is maintained under substantial tension to preclude "whipping" of the same.

Another object of this invention is to provide a free running draw chuck which is readily adaptable for use with machine lathe tools having tailstock spindles of different dimensions.

Still another object of this invention is the provision of a device of the type described which is simple and inexpensive to manufacture and maintain, sturdy and durable in construction, and highly reliable in use.

Other and further objects reside in the combination of elements, arrangement of parts and features of construction, all of which will be obvious from the following detailed description, which makes reference to the accompanying drawing, wherein:

FIG. 1 is a schematic elevational view of a device according to this invention, showing the manner in which the same would be associated with a machine lathe tool;

FIG. 2 is an enlarged exploded view of the free running draw chuck of this invention, in cross section, showing the manner in which the same is secured to a tailstock spindle of a lathe and also showing a conventional jaw means to be associated therewith; and FIG. 3 is a fragmentary view, partly in elevation and partly broken away for illustrative clarity, illustrating a catheter that may be fabricated utilizing the device of this invention.

Like reference characters refer to like parts throughout the several views of the drawing.

Referring now to the drawing, and particularly FIG. 1, portions of a conventional machine lathe tool are designated generally by the reference numeral 10, with the rotatable headstock thereof being designated generally by the reference numeral 12, and a fixed tailstock spindle of the conventional tailstock being designated generally by the reference numeral 14. The free running draw chuck of this invention is shown as secured to the tailstock spindle 14 and is designated generally by the reference numeral 15. A conventional jaw means, such as a Jacob chuck is designated generally by the reference numeral 16, and a relatively thin, elongated workpiece in the form of a flexible metal wire 18 is shown secured between the headstock 12 and the jaw means 16.

By reference to FIG. 2, details of the free running draw chuck 15 of the instant invention will now be seen. The device 15 includes casing means 20 having a tubular portion 22 and a front face portion 24 which together define an interior chamber. A central aperture 26 is formed through the front face portion 24 and communicates with the interior chamber.

A shaft member designated generally by the reference numeral 28 includes a front end portion 30 rotatably supported within the aperture 26 with terminal portions 32 extending beyond the aperture 26 to the exterior of the casing means 20. The terminal portions 32 are threaded for association with internally threaded portions 34 of the jaw means 16 in a well-known manner. The shaft member 28 includes rear end portions 36 which are located within the chamber in spaced relation to the interior of the front face portion 24 of the casing means 20. Fixed to the rear end portions 36 of the shaft member 28 is a transversely extending flange means 38 which is larger than the aperture 26 but smaller than the interior of the tubular portion 22 of the casing means 20.

Thrust bearing means, designated generally by the reference numeral 40, are carried within the chamber and operatively positioned between the interior of the front face portion 24 of the casing means 20 and the flange means 38 of the shaft member 28. The thrust bearing means 40 may be ball bearing means as shown. Suitable thrust bearing means may be angular-contact-type thrust bearings such as Fafnir bearing No. 7203W SU as shown in the Fafnir Service Catalog No. 19, Sixth Edition, of Sept. 1958. As will be seen, preferably a pair of such thrust bearing means is used, the inner races 42 of which surroundingly engage the shaft member 28 between the interior of the front face portion 24 of the casing means 20 and the flange means 38 of the shaft member 28, and the outer races 44 of which engage the interior of the tubular portion 22 of the casing means 20.

Preferably, an end cap means 46 is fixed within the chamber of the casing means 20, rearwardly of the flange means 38 of the shaft member 28. To this end, a shoulder 48 is defined on the interior of the tubular portion 22 of the casing means 20 rearwardly of the flange means 38 of the shaft member 28 and edge portions of the front surface 50 of the end cap means 46 abuttingly engage the shoulder 48. The end cap means 46 extends entirely across the chamber within the casing means 20 and any conventional lubricating means, such as grease or the like, may be carried within the chamber between the interior of the front face portion 24 of the casing means 20 and the front surface 50 of the end cap means 46.

The end cap means 46 includes peripheral portions 52 which are tapered inwardly and rearwardly from the front surface 50 thereof. A plurality of end cap setscrew means (one of which is shown at 54 as illustrative in the drawing) are threadably secured in circumferentially spaced relation through the tubular portion 22 of the casing means 20 rearwardly of the shoulder 48. The terminal portions 56 of the end cap setscrew means 54 engage the tapered peripheral portions 52 of the end cap means 46, and due to the tapered nature of the peripheral portions 52, function to urge the edge portions of the front surface 50 of the end cap means 46 forwardly into abutting engagement with the shoulder 48 to thereby insure a seal which precludes escape of the lubricating means from the portion of the chamber between the interior of the front face portion 24 of the casing means 20 and the front surface 50 of the end cap means 46.

Since the tailstock spindle 14 of different lathes may have different outside diameters, a plurality of brass split bushing means 58 of different dimensions may be provided to surroundingly engage the tailstock spindle 14 within the portion of the chamber of the casing means 20 rearwardly of the end cap means 46. A plurality of tailstock spindle setscrew means (one of which is shown as illustrative at 60 in the drawing) may be threadably secured in circumferentially spaced relation through the tubular portion 22 of the casing means 20, the terminal portions 62 of the tailstock spindle setscrew means 60 engaging the exterior of the bushing means 68 to press the same into securing relationship with a tailstock spindle 14 of a lathe surrounded thereby.

The use and operation of the device 15 of the instant invention will now be readily understood. The casing means 20 is secured to the fixed tailstock spindle 14 of a lathe through the intermediary of the bushing means 58 and the tailstock spindle setscrew means 60.

Any conventional jaw means 16, such as a Jacob chuck is threadably secured to the terminal portions 32 of the shaft member 28 and an elongated workpiece 18 is then fixed between the headstock 12 of the lathe and the jaw means 16 in known manner. It is to be understood that the headstock 12 may be of any conventional form and is merely shown schematically in the drawing. Similarly, other jaw means may be substituted for the Jacob chuck shown illustratively in the drawing.

The workpiece 18 is placed under tension between the headstock 12 and the jaw means 16 in any conventional manner, and due to the use of the free running draw chuck of this invention, the same may be rotated under high speed without "whipping".

In the fabrication of a fine catheter, a portion of which is designated generally by the reference numeral 70 in FIG. 3, the workpiece 18 may be used as a mandrel. With this arrangement, catheters having unique features not commonly available such as a wire reinforced wall as thin as 0.010 inches and in the range of 1 mm. internal diameter sizes can be made. Specifically, a mandrel or workpiece 18 having an external diameter corresponding to the desired internal diameter of the catheter 70 is held between the headstock 12 and the jaw means 16, while tension is applied until the mandrel or workpiece shows no deviations when turned at operating speeds. The workpiece 18 may then be coated with an elastomeric material, such as rubber polymer paste and cured to form an inner plastic tube 72. Wire reinforcement 74 is supplied by helically winding over the cured polymer with, for example, 302 stainless steel spring wire of 0.004 or 0.005 inch diameter at 80–110 winds per inch. The wire is subsequently coated with an elastomeric material 76 and cured thus confining the wire 74 between the layers 72, 76 of plastic. Upon completion of the fabrication, the finished catheter 70 may be removed from the mandrel or workpiece 18 resulting in tubing with an accuracy of ±0.005 inches overall.

A wire-reinforced catheter of the type shown in FIG. 3 and of the illustrative dimensions set forth hereinabove cannot efficiently be made by other known techniques. Conventional chucks are not capable of operating in a manner so as to maintain a flexible, fine wire such as the workpiece 18 turning at high speeds without deviations. The ability to confine a helical wire such as 74 in the catheter tube 70 prevents kinking of the catheter while the inner and outer layers of plastic 72, 76, respectively, preclude contact of the wire 74 with the body.

It will now be seen that there is herein provided an improved free running draw chuck which satisfies all the objectives of the instant invention, and others, including many advantages of great practical utility and commercial importance.

Accordingly, what is claimed is:

1. A free running draw chuck for use with a lathe having a rotatable headstock and a tailstock including a fixed tailstock spindle, comprising casing means having an interior surface defining a chamber, said casing means including a generally tubular portion and a front face portion on one end of said tubular portion, said front face portion defining a central aperture therethrough, a shaft member including a front end portion rotatably supported within said aperture and including terminal portions extending beyond said aperture to the exterior of said casing means, and a rear end portion located within said chamber in spaced relation to the interior of said front face portion of said casing means, transversely extending flange means on said rear end portion of said shaft member, said flange means being larger than said aperture and smaller than the interior of said tubular portion of said casing means, thrust bearing means within said chamber operatively positioned between the interior of said front face portion of said casing means and said flange means of said shaft member to support said shaft means for rotation relative to said casing means, means for securing said tubular portion of said casing means to the tailstock spindle of a lathe rearwardly of said flange means of said shaft member, and means for securing said terminal portions of said shaft member to a jaw means adapted to engage one end of a relatively thin, elongated element, the other end of which is rotatably carried by the headstock of the lathe, whereby the elongated element can be freely rotated relative to the fixed tailstock spindle of the lathe while maintained under tension between the rotatable headstock and the jaw means.

2. The free running draw chuck of claim 1 wherein said tubular portion of said casing means includes a shoulder defined in its interior rearwardly of said flange means of said shaft member, end cap means extending transversely across said chamber and including a front surface, edge portions of which abuttingly engage said shoulder, whereby said shoulder precludes said end cap means from moving forwardly within said chamber.

3. The free running draw chuck of claim 2 further including lubricating means within said chamber between the interior of said front face portion of said casing means and said front surface of said end cap means.

4. The free running draw chuck of claim 2 wherein said end cap means further includes peripheral portions tapered inwardly and rearwardly from said front surface thereof, and end cap setscrew means threadably secured in circumferentially spaced relation through said tubular portion of said casing means rearwardly of said shoulder, said end cap setscrew means having terminal portions engaging said tapered peripheral portions of said end cap means to urge said edge portions of said front surface of said end cap means forwardly into abutting engagement with said shoulder.

5. The free running draw chuck of claim 1 wherein said means for securing said terminal portions of said shaft member to a jaw means includes threaded means defined on said terminal portions.

6. The free running draw chuck of claim 1 wherein said means for securing said tubular portion of said casing means to the fixed tailstock spindle of a lathe includes tubular bushing means positioned rearwardly of said end cap means within said chamber, said bushing means being adapted to surroundingly engage the fixed tailstock spindle of a lathe, and tailstock spindle setscrew means threadably secured in circumferentially spaced relation through said tubular portion of said casing means, said tailstock spindle setscrew means having terminal portions engaging the exterior of said bushing means to press said bushing means into securing relationship with a tailstock spindle of a lathe surrounded thereby.

7. The free running draw chuck of claim 1, wherein said thrust bearing means includes ball bearings.

* * * * *